United States Patent

Ogura et al.

[11] 3,912,376
[45] Oct. 14, 1975

[54] ZOOM LENS SYSTEM CAPABLE OF MACRO-PHOTOGRAPHY

[75] Inventors: Toshinobu Ogura, Tondabayashi; Shuzi Ogino, Sakai, both of Japan

[73] Assignee: Minolta Camera Kabushiki Kaisha, Osaka, Japan

[22] Filed: Aug. 27, 1973

[21] Appl. No.: 391,088

[30] Foreign Application Priority Data
Apr. 13, 1973  Japan.............................. 48-43785

[52] U.S. Cl................................ 350/186; 350/187
[51] Int. Cl.² ........................................ G02B 15/00
[58] Field of Search................... 350/184, 186, 187

[56] References Cited
UNITED STATES PATENTS

| | | | |
|---|---|---|---|
| 3,661,445 | 5/1972 | Someya | 350/186 |
| 3,731,987 | 5/1973 | Iida | 350/187 |

*Primary Examiner*—Ronald L. Wibert
*Assistant Examiner*—Conrad J. Clark
*Attorney, Agent, or Firm*—Wolder & Gross

[57] ABSTRACT

A zoom lens system capable of macro-photography is provided with a lens control mechanism and consists, from the object side, of a focusing lens component, a zooming lens component, a compensating lens component and an image forming component and upon zooming, imparts to the zooming lens component and the compensating lens component mutually different movements along an optical axis. One of the zooming lens component and compensating lens component consists of a first lens group having a negative refractive power and a second lens group having a positive refractive power, with either one of the first and second lens groups being released from the control of the lens control mechanism so as to render the same stationary and the other lens being moved along the optical axis by means of the zooming lens control mechanism.

5 Claims, 11 Drawing Figures

ZOOM LENS SYSTEM CAPABLE OF MACRO-PHOTOGRAPHY

BACKGROUND OF THE INVENTION

The present invention relates to a zoom lens system which allows a super-close-distance photography, that is, the macrophotography by moving a part of the lens component and the other lens component for use in zooming by means of the zooming lens control mechanism.

A macro-photography lens system is known, in which a specific lens included in a zooming lens component or a compensating lens component is moved along the optical axis by means of a mechanism independent of the control by a zooming mechanism.

However, such known systems suffer from disadvantages in that there is required two lens control mechanisms for controlling the aforesaid specific lens being moved along the optical axis by means of a macro-photographing mechanism in addition to a zooming mechanism for zooming a lens system and in that, in addition, because of the zooming lens system having an inherent focusing adjusting mechanism for adjusting the focusing, there results in a complicated lens controlling mechanism with the resultant operational error in focusing, zooming and macro-photography operations.

It is a primary object of the present invention to provide a zoom lens system which is capable of macro-photography without the need to provide a special lens shifting or controlling mechanism for such macro-photography.

It is another object of the present invention to provide a zoom lens system in which a lens adjusting mechanism for use in zooming photographing and macro-photographing is a simple in construction and minimizes operational error.

It is a further object of the invention to provide a zoom lens system which is provided with a barrel mechanism for use therein.

SUMMARY OF THE INVENTION

The above and other objects of the present invention are achieved in the zoom lens system of the present invention, in which either one of a zooming lens component and a compensating lens component consists of a first lens group having a negative refractive power and a second lens group having a positive refractive power, said components being adapted to be shifted along an optical axis under the control of a lens controlling mechanism for use in zooming, with one of said first and second lens groups being adapted to be shifted, being released from the control of the zoom controlling mechanism, while the other lens group and the other lens component for use in zooming is shifted along the optical axis under the control of the zoom controlling mechanism, whereby an arrangement is provided which is suited for the macrophotography.

Referring to the aforesaid groups as first and second lens groups does not imply the positional order of the lens groups, but merely designates one of the groups as the first and the other as the second group.

One aspect of the invention is that there is provided only a lens controlling mechanism for zooming in addition to a lens adjusting mechanism, the lens controlling mechanism being used for controlling the lens system for macro-photographing a photographic object positioned extremely close to the camera.

According to another aspect of the invention, part of the lenses adapted to be moved along the optical axis under the control of the aforesaid lens controlling mechanism for use in zooming may be released from the control of the aforesaid lens controlling mechanism.

In addition, a lens group to be freed from the control of said lens controlling mechanism may be the first lens group having a negative refractive power or the second lens group having a positive refractive power of the zooming lens component or a compensating lens component.

This means that the refractive power of the zooming lens component or compensating lens components in the zoom lens system is divided into two lens groups positive and negative, respectively, spaced apart from each other along the optical axis. Assuming the refractive powers of both lens groups of $Pa$ and $Pb$, the refractive power $P$ to be composed at the time of zooming will be given as follows:

$$P \approx Pa + Pb$$

Then, the composite refractive power $P'$ will be expressed, including the aforesaid axial spacing $e$ as follows:

$$P' = Pa + Pb - ePaPb$$

Then, the value $P$ is increased in a positive direction, and thereby an additional refractive power $|ePaPb|$ will be produced in a zoom lens system such that, depending on the aforesaid refractive power $P'$ being positive or negative, the aforesaid positive or negative lens group will be moved toward the principal point of said composite refractive power closer to the image side or toward the photographic object, thus presenting a lens arrangement suited for macro-photography.

BRIEF DESCRIPTION OF THE DRAWINGS

FIGS. 7 through 10 show the aberration curves of the lens system as shown in FIG. 5, in which FIG. 7 represents the aberration curve when zoomed to a long focal length position, FIG. 8 shows the aberration curves when zoomed to a short focal length position, FIG. 9 shows that at the time of macrophotography at a photographing magnification of 0.2, FIG. 10 does the aberration curves at the time of macro-photography at a photographing magnification of 0.3

DESCRIPTION OF THE PREFERRED EMBODIMENTS

Figure 1:
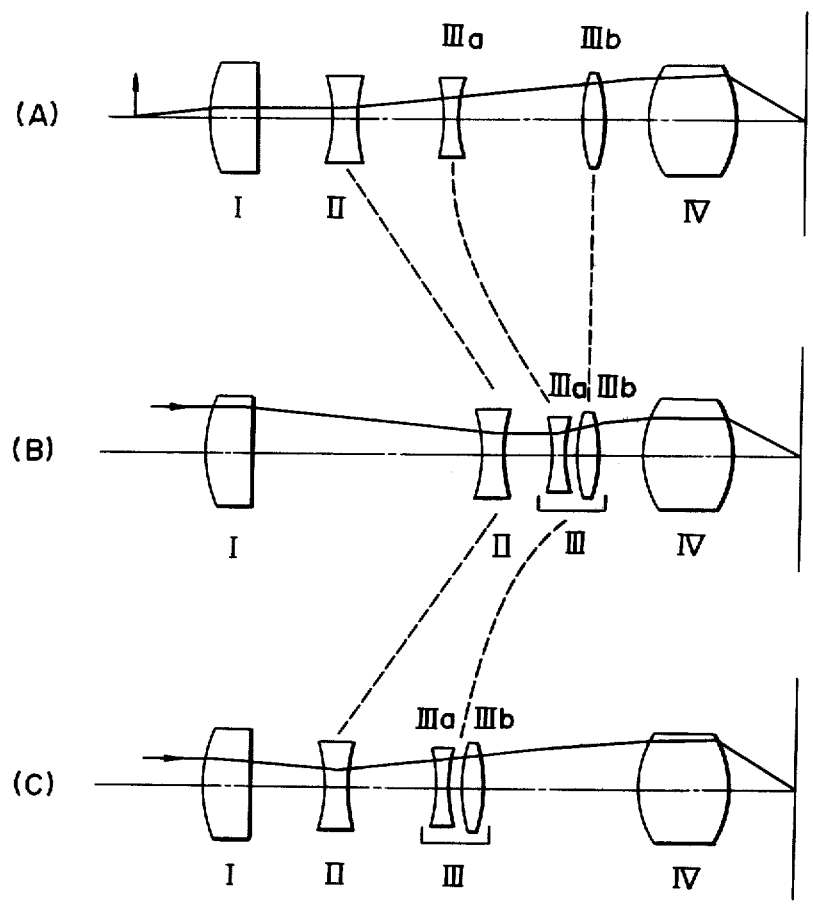
FIG. 1 is a block diagram showing arrangements of a lens system controlled by a lens controlling mechanism according to a first embodiment of the present invention, in which (A) represents the system adjusted for macro-photography, (B) when zoomed to a long focal length position and (C) when zoomed to a short focal length position, while showing the paths of the lenses moving along the optical axis under the control of the lens controlling mechanism to provide the aforesaid respective adjustments.

Referring now to FIG. 1 which shows one embodiment of the present invention diagrammatically, the first lens component I is a focusing component for use in adjusting the system focus, having a positive refractive power, and is fixed at a preset position on the optical axis except when in use for focusing. The second and third lens components II and III are movable at mutually different non-linear rates along the optical axis under the control of the lens controlling mechanism, said components having a composite negative refractive power and being referred to as a zooming component and a compensating component. The fourth lens component IV is a relay lens system adapted to form an image and is a lens component which is usually fixed on the optical axis.

FIG. 1 (B) and (C) represent adjustments of the lens system to zoomed positions for ordinary photographing distances, (B) a zoom position at a long focal length and (C) a zoom position at a short focal length.

In this embodiment, however, the third compensating lens component III has a negative refractive power as a whole, and, in addition, the component III is divided into two, positive and negative lens groups, i.e., the first lens group IIIa having a negative refractive power and the second lens group IIIb having a positive refractive power, with the negative first lens group IIIa being located on the photographic object side on the optical axis. It should be noted that the first and second lens groups may be a single lens or a lens group consisting of a plurality of lenses.

As can be seen from FIG. 1 (B) and (C), at the time of zooming of lenses, the first lens group IIIa and the second lens group IIIb are moved in an integral manner as a unit along the optical axis by means of a lens controlling mechanism. In contrast thereto, with the arrangement adjusted for macrophotography of a photographic object in the close distance mode to a camera as shown in FIG. 1 (A), either one of the first and second lens groups is released from the zooming control mechanism and the other is moved by means of the aforesaid lens controlling mechanism.

When shifting from the condition when zoomed to a long focal length as in FIG. 1 (B) to the macro-photography condition, as at (A), the second lens group IIIb is freed from the control of the lens controlling mechanism and maintained stationary at a given predetermined position on the optical axis, while the zooming lens component II and the second lens IIIa are both moved along the paths leading the same to the short focal length side, thereby providing an arrangement suited for macro-photography.

Figure 2:
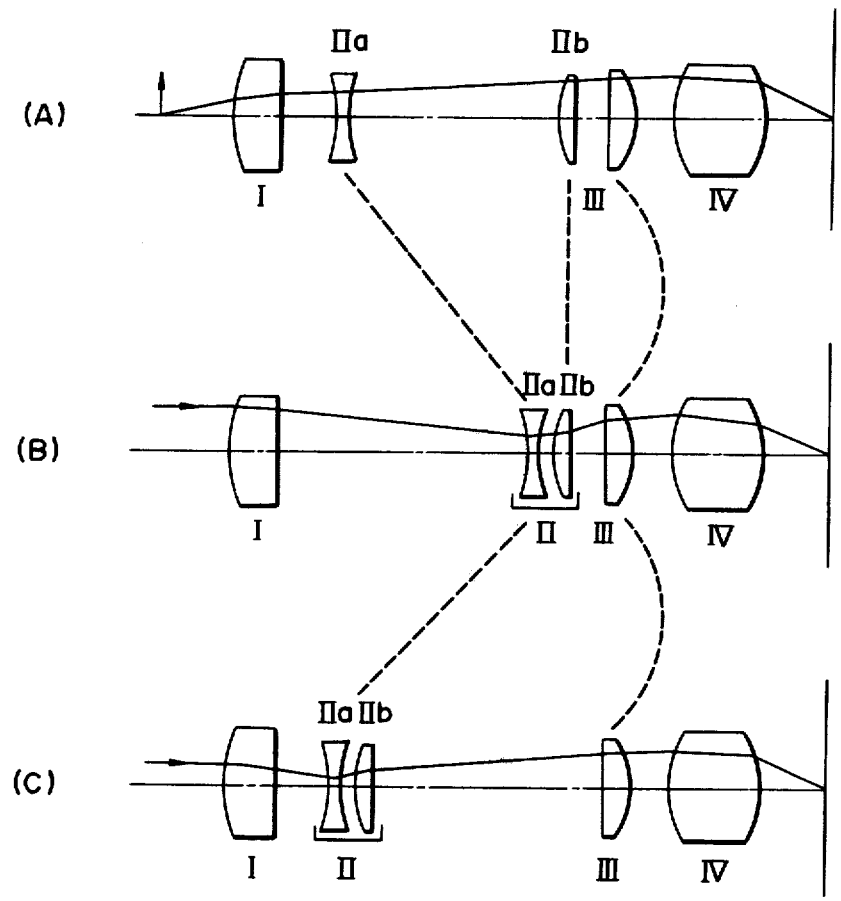
FIG. 2 is a block diagram similar to that of FIG. 1, of a second embodiment of the invention, showing a lens system for use in zooming under the control of the lens controlling mechanism.

FIG. 2 shows the second embodiment of the present invention, of the type in which the second lens component II i.e., a zooming lens component having a negative refractive power as a whole is divided into the first lens group IIa which is on the object side and has a negative refractive power and the second lens group IIb which is on the image side and has a positive refractive power, and the first and second lens groups IIa and IIb are moved in an integral unit fashion along the optical axis with the compensating lens component III being moved along the optical axis under the control of the lens controlling mechanism, so as to effect the zooming to a short focal length relationship as shown at (C) of FIG. 2 and to a long focal length relationship as shown at (B) of the same figure. More particularly, the second embodiment provides an arrangement in which, in a long focal length relationship, the second lens group IIb is freed from the control of the aforesaid lens controlling mechanism to thereby render the same stationary on the optical axis, while the first lens group IIa in the remaining zooming lens component and a compensating lens component are controlled by means of the lens controlling mechanism, in a similar manner to the case when zoomed to the short focal length relationship, thereby moving along the optical axis, thus enabling the macro - photographing of a photographic object positioned at an extremely close distance to the camera.

Figure 3:
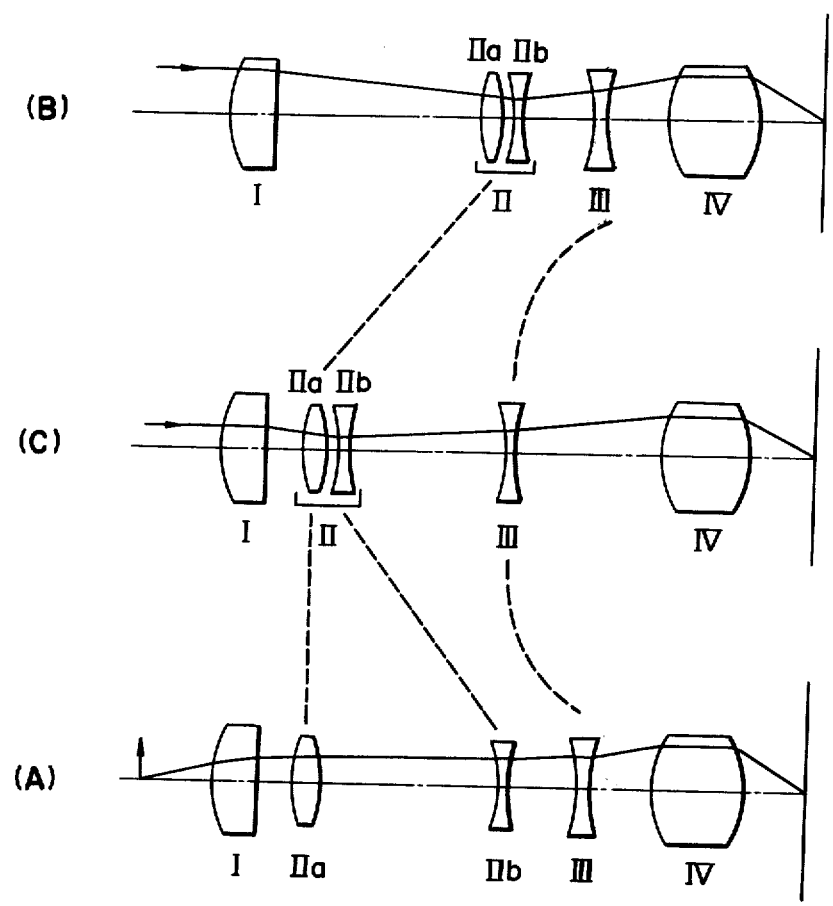
FIG. 3 is a block diagram of a third embodiment, controlled by a lens controlling mechanism in which (C) represents the lens system adjusted for macro-photography, (A) for a long focal length and (B) for a short focal length, while showing the paths of the lenses moving along the optical axis under the control of the lens controlling mechanism for zooming.

FIG. 3 shows the third embodiment, specifically a zoom lens system, in which the second lens component II, which is a zoom component having a negative refractive power as a whole, is divided into a first lens group IIa located on the object side and having a positive refractive power and a second lens group IIb located on the image side and having a negative refractive power, whereby said first and second lens groups IIa and IIb are shifted integrally as a unit along the optical axis, while the compensating lens component III is also shifted along the optical axis under the control of the lens controlling mechanism, thus effecting a zoom position at a long focal length as shown in B of FIG. 3 or a zoom position at a short focal length as shown in C of FIG. 3. FIG. 3 A shows the system adjusted for extremely close-distance macro-photography, in which, in the condition when zoomed to a short focal length, the first lens group IIa is released from the control of the lens control mechanism so as to maintain a constant stationary position on the optical axis, while the remaining zooming components, i.e., the second lens group IIb and the compensating lens group III are shifted along the optical axis under the control of the lens control mechanism in the same manner as they are shifted to the long focal length relationship, thus achieving the macrophotography as explained above.

Figure 4:
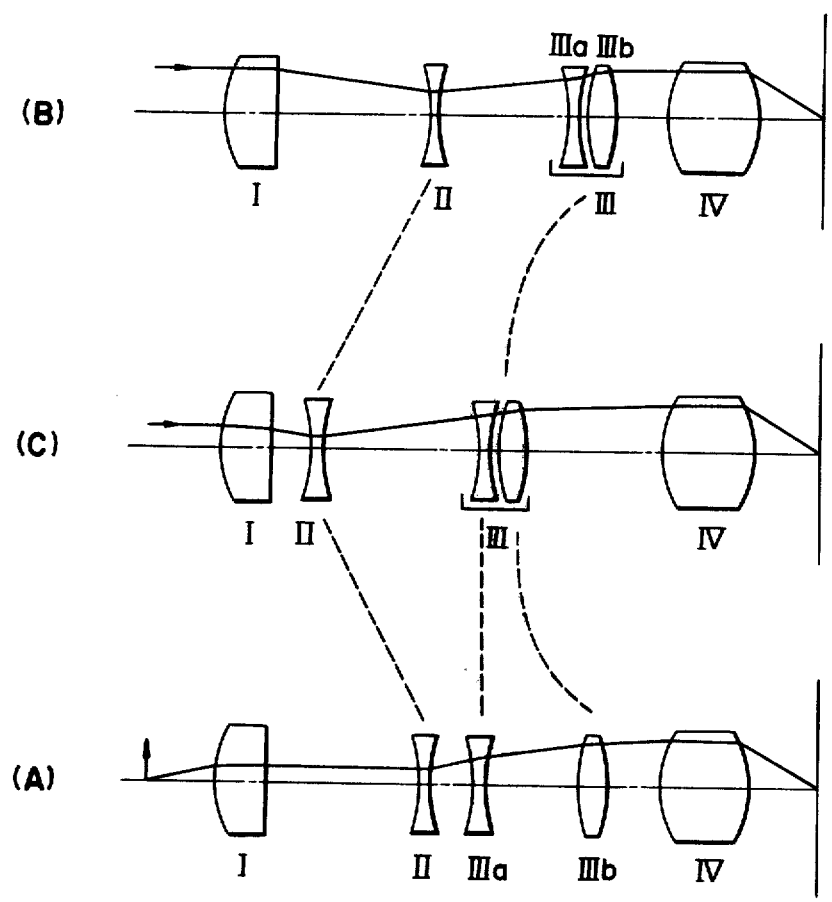
FIG. 4 is a block diagram similar to that of FIG. 3, of a fourth embodiment of the present invention, showing a lens system for use in zooming under the control of the lens controlling mechanism.

FIG. 4 illustrates the fourth embodiment of the present invention, specifically, a zoom lens system, in which the third lens component is divided into a first group IIIa located on the object side and having a negative refractive power and a second lens group IIIb located on the image side and having a positive refractive power, whereby the first and second lens groups IIIa and IIIb are shifted integrally as a unit along the optical axis, while the zoom lens component II having a negative refractive power as a whole is shifted along the optical axis under the control of the lens control mechanism, thus effecting a zoom position with a long focal length as shown in B of FIG. 4 or a zoom position with a short focal length as shown in C of the same figure. FIG. 4 A shows the system adjusted for extremely close-distance macro-photography, in which, in the condition when zoomed to a short focal length, the first lens group IIIa is released from the control of the lens controlling mechanism so as to maintain the same stationary position on the optical axis, while the remaining zoom components, i.e., the second lens group IIIb and the zooming lens component II are shifted along the optical axis under the control of the lens control mechanism in the same manner as they are shifted to a long focal length relationship, thus achieving the macro-photographing as above.

Figure 5:
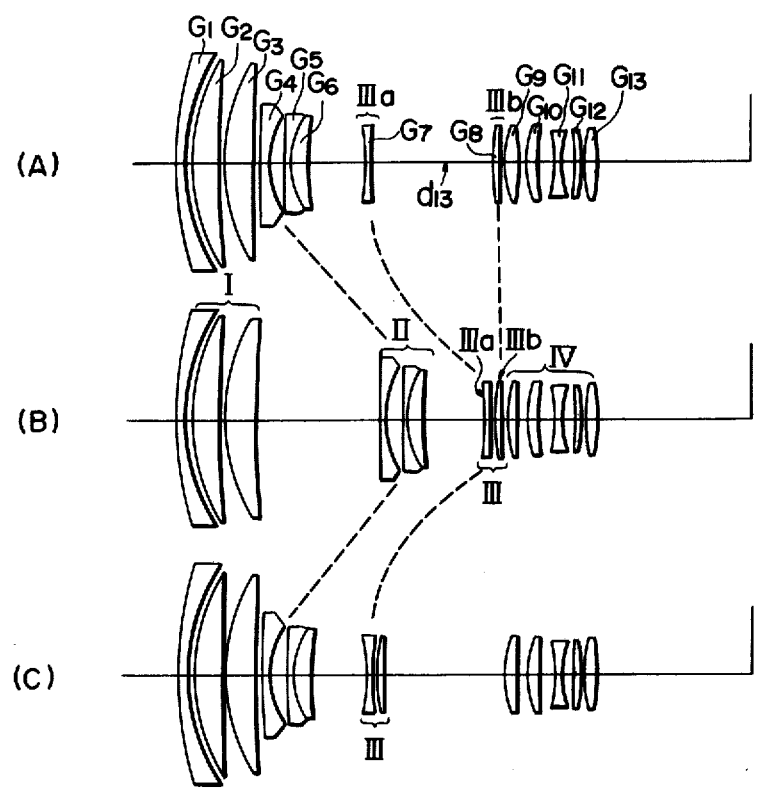
FIG. 5 is a block diagram showing a specific lens system in detail in accordance with the first embodiment of the invention, said lens system being controlled by the lens controlling mechanism, in which (A) represents the system adjusted for macro-photography, (B) when zoomed to a long focal length and (C) when zoomed to a short focal length.

FIG. 5 shows an example of the lens system of the first embodiment of the invention as shown in FIG. 1, and this example may have the dimensions and relationships set forth in the following Table I.

Upon zooming, the third lens component III is moved in nonlinear fashion relative to the second lens component II under the control of the lens control mechanism as shown in FIG. 5 (B) and (C). In this respect, the third lens component III is divided into the first lens group IIIa having a negative refractive power (in the present example the single concave lens G7 is used), and the second lens group IIIb having a positive refractive power (a single convex lens G8 being used), while the both lens groups may be coupled or released from coupling, as required.

In the condition when zoomed to a long focal length as shown at (B) of FIG. 5, the distance $S$ to the object will be continuously lessened, while the magnification $M$ will be increased, when the aforesaid coupling of one lens group to another is released and thus the second lens group G8 is freed from the control of the aforesaid lens control mechanism, and the first lens group G7 of the third lens component is moved in a non-linear fashion relative to the lenses G4, G5 and G6 of the second lens component to present the arrangement as shown at (A).

Figure 6:
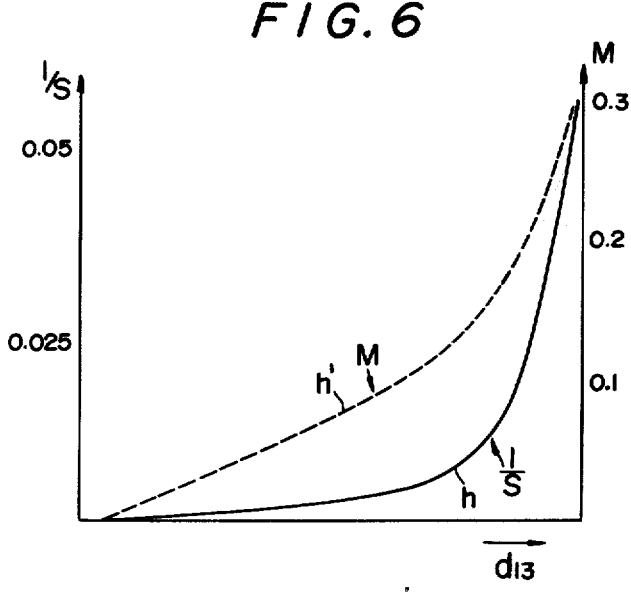
FIG. 6 is a plot showing the relationship of the axial spacing between the first lens group having a negative refractive power and the second lens group having a positive refractive power in a compensating lens component of the lens system as shown in FIG. 5, to the magnification and the distance between the frontmost lens of a focusing component and a photographic object.

FIG. 6 shows the movements described above, the curve $h$ in a solid line representing the change in $1/S$, while the curve $h'$ represents the change in $M$.

Figure 7:
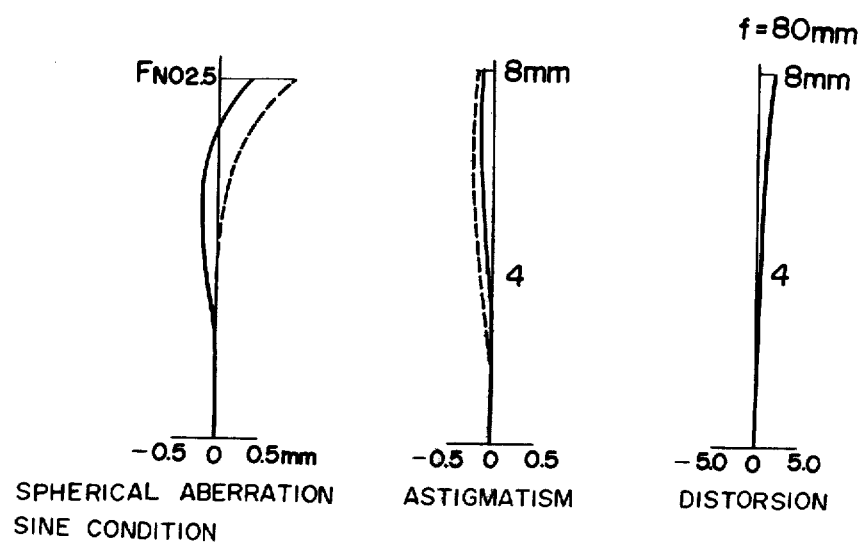
Figure 8:
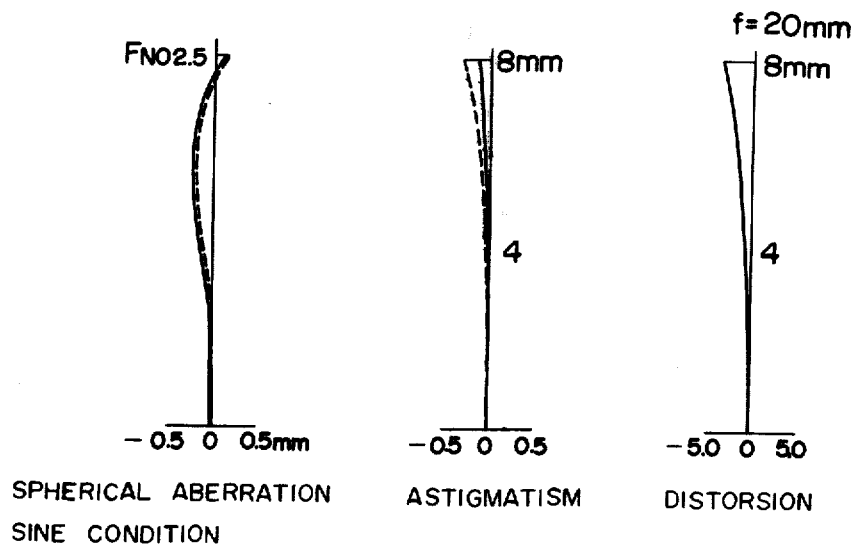

FIG. 7 and FIG. 8 illustrate respective aberrations for an infinitively distant object when the lens system as

TABLE I

| | | Example f=20~80 Radius of curvature | $F_{No}$=25 Axial distance | Angle of field 2W =45°~11°30' Refractive index | Abbe's number |
|---|---|---|---|---|---|
| I | G1 | $r_1 = 91.02$ $r_2 = 42.43$ | $d_1 = 22$ | $N_1 = 1.7847$ | $V_1$ |
| | C2 | $r_3 = 45.11$ $r_4 = 375.6$ | $d_2 = 1.0$ $d_3 = 66$ | $N_2 = 1.6214$ | $v_2 = 61.2$ |
| | G3 | $r_5 = 42.86$ $r_6 = 520.9$ | $d_4 = 0.2$ $d_5 = 6.716$ | $N_3 = 1.6214$ | $v_3 = 61.2$ |
| II | G4 | $r_7 = 510.4$ $r_8 = 18.64$ | $d_6 = 26.329 \sim 1.329\text{*-**}$ $d_7 = 1.35$ | $N_4 = 1.6214$ | $v_4 = 61.2$ |
| | G5 G6 | $r_9 = 174.1$ $r_{10} = 16.75$ $r_{11} = 52.97$ | $d_8 = 3.795$ $d_9 = 1.0$ $d_{10} = 3.5$ | $N_5 = 1.6405$ $N_6 = 1.7618$ | $v_5 = 60.1$ $v_6 = 26.5$ |
| III | G7 | $r_{12} = -40.82$ $r_{13} = 245.4$ | $d_{11} = 14.014 \sim 13.009\text{*-**}$ $d_{12} = 1.0$ | $N_7 = 1.6214$ | $V_7 = 61.2$ |
| | G8 | $r_{14} = 78.05$ $r_{15} = 223.6$ | $d_{13} = 1.0 \sim 27.005\text{**}$ $d_{14} = 1.5$ | $N_8 = 1.6214$ | $V_8 = 61.2$ |
| IV | C9 | $r_{16} = 24.53$ $r_{17} = \infty$ | $d_{15} = 0.972 \sim 26.977\text{*}$ $d_{16} = 2.7$ | $N_9 = 1.5168$ | $V_9 = 64.2$ |
| | G10 | $r_{18} = 21.60$ $r_{19} = 86.22$ | $d_{17} = 2.0$ $d_{18} = 2.7$ | $N_{10} = 1.6583$ | $V_{10} = 58.5$ |
| | G11 | $r_{20} = -38.73$ $r_{21} = 20.92$ | $d_{19} = 3.697$ $d_{20} = 1.418$ | $N_{11} = 1.7006$ | $V_{11} = 30.1$ |
| | G12 | $r_{22} = -393.3$ $r_{23} = -29.74$ | $d_{21} = 3.197$ $d_{22} = 2.1$ | $N_{12} = 1.6583$ | $V_{12} = 58.5$ |
| | G13 | $r_{24} = 53.67$ $r_{25} = -64.98$ | $d_{23} = 0.2$ $d_{24} = 2.3$ | $N_{13} = 1.6583$ | $V_{13} = 58.5$ |

*variable distance for zooming
**variable distance for micro-photography ($d_{13}$ = 1.0 for the infinite photographic objects)

In the system illustrated in FIG. 5, the lenses G1, G2, and G3 correspond to the focusing or first lens component I of the first described embodiment as illustrated in FIG. 1; the lenses G4, G5 and G6 correspond to the zooming lens component II, the second lens component; lenses G7 and G8 form the compensating lens component III, the third lens component for zooming at ordinary photographing distances; and lenses G9 through G13 form the fourth lens component, the image forming lens component IV.

shown in FIG. 5 is shifted to a zoomed position of long focal length and show the respective aberrations when zoomed to the short focal length position.

Figure 9:
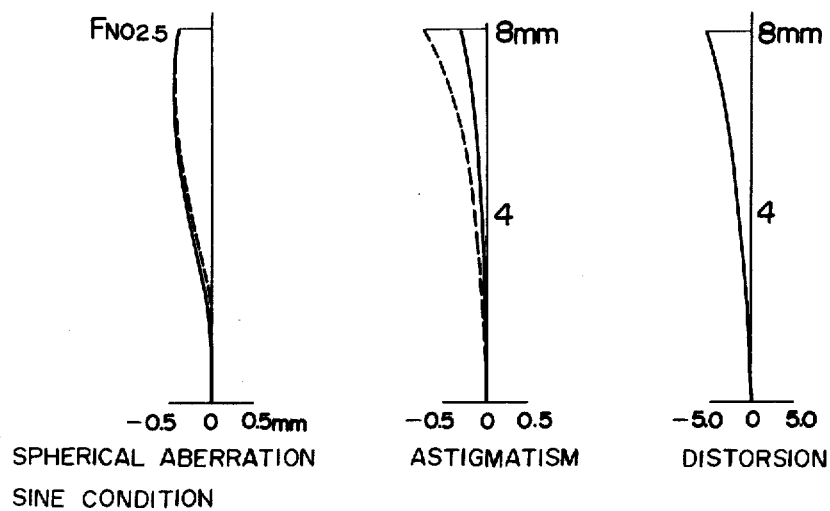
Figure 10:
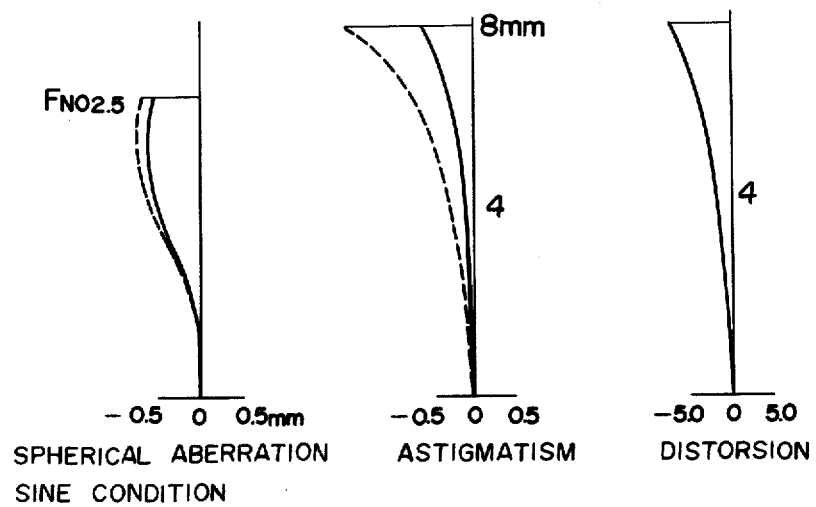

FIGS. 9 and 10 show the respective aberrations, when the lens system is used for macro-photographing at magnifications of 0.2 and 0.3.

The refractive power $P$ of the third lens component III consisting of the first lens group G7 and the second lens group G8 will be given, when the both are coupled integrally, as follows:

$$P = -0.012$$

On the other hand, the refractive power Pa and Pb of the first and second lenses, when released from the coupling relation, will be given as follows:

$$Pa = -0.018 \quad Pb = 0.006$$

The maximum photographing magnification of about 0.1, when the both lenses are coupled together integrally, will be increased to about 0.3, by separating the both lenses and moving by said controlling manner. The greater value of the aforesaid $|Pa|$ permits further increase in the maximum magnification by using the same lens shifting arrangement.

Figure 11:
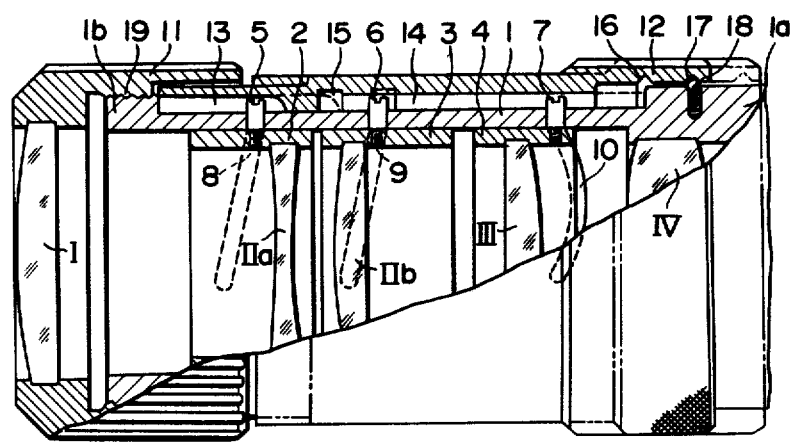
FIG. 11 shows a longitudinal cross-sectional view, partially broken, of a lens controlling mechanism embodying the present invention.

Refer now to FIG. 11 which shows the lens control mechanism, as used in the embodiment of the invention shown in FIG. 2. In the drawing, each lens is shown diagrammatically as being a single lens. Shown at I is a focusing lens component, and at II is a zooming lens component which consists of the first lens group II$a$ having a negative refractive power and the second lens group II$b$ having a positive refractive power, said first and second lens components being separable from each other. Shown at III is a compensating lens component and at IV is an image forming lens component.

A fixed cylinder 1 has a base portion adapted to be mounted on or coupled to a camera body, said base portion fixedly mounting the image forming lens IV inwardly thereof and has a front inner peripheral wall, along which there are slideably fitted along the optical axis and in turn from the photographic object side, a movable lens frame 2 holding the first lens group II$a$ of the aforesaid zooming lens component, a movable lens frame 3 holding the second lens group II$b$ thereof and a movable lens frame 4 holding the compensating lens component III inwardly thereof. Radially extending in an outwardly projecting manner from the outer circumferential surfaces of frames 2, 3 and 4 are guide pins 5, 6 and 7 respectively. Helical cam slots 8, 9 and 10 are formed in the fixed cylinder 1, said cam slots being adapted to guide said guide pins 5, 6 and 7 with said pins being slideably fitted therein. The aforesaid cam slots 8 and 9 are formed at a predetermined spacing along the optical axis.

The outer peripheral surface of the tip portion 1$b$ of the fixed mirror cylinder 1 is formed with a helicoid 19 threaded in a distance-adjusting ring 11 which holds the focusing lens component I.

Loosely fitted and slideable along the optical axis on the outer peripheral surface of the fixed cylinder 1 is an operating ring 12, in the inner peripheral wall of which are provided linear slots 13 and 14 extending in a direction parallel to the optical axis, and an annular slot 15. The tips of the guide pins 5, 6 and 7 of the moveable lens frames 2, 3 and 4 are adapted to slideably engage slots 13, 14 and 15, said pins 2, 3 and 4 extending in a projecting manner through cam slots 8, 9 and 10. Thus, when the operating ring 12 is rotated relative to the fixed cylinder 1, the rotation thereof will be transmitted by means of said linear slots 13 and 14 to the moveable lens frames 2, 3 and 4. Furthermore, the inner peripheral wall of the operating ring 12 is formed with two click slots 16 and 17 extending in an annular form and engageable with a click ball 18 which is urged outwardly under the action of a spring which is mounted in a slot radially extending in the outer peripheral wall of the base portion 1$a$ of the fixed cylinder 1, such that, when the operating ring 12 slides in an axial direction relative to the fixed cylinder 1, either one of the aforesaid click slots 16 and 17 will engage the click ball 18 so as to arrest the operating ring 12 against its sliding movement.

Accordingly, in a condition shown where the operating ring 12 slides toward a photographic object along the optical axis relative to the fixed cylinder 1 to thereby bring the click slot 17 into engagement with the click ball 18, when the operating ring 12 is rotated, then the linear guide slots 13 and 14 will engage the guide pins 5, 6 and 7 to thereby transmit the rotation to the moveable lens frames 2, 3 and 4, while the aforesaid guide pins 5, 6 and 7 are guided along the guide slots 8, 9 and 10 so as to be shifted axially of the fixed cylinder 1 with its rotation, thus effecting zooming. However, at this time, the cam slots 8 and 9 are located at a given spacing, such that the first lens group II$a$ of the zooming lens component II and the second lens group II$b$ will be shifted, maintaining a constant spacing.

When the lens system assumes the longest focal length position by means of the aforesaid zooming operation and the operating ring 12 is shifted rearward relative to the fixed cylinder 1 at this position, then the click slot 16 will engage the click ball 18 as shown by a broken line in the drawing. At this time, the annular slot 15 of the operating ring 12 will be positioned in registry with the guide pin 6 of the moveable lens frame 3 of the second lens frame II, such that the guide pin 6 will slideably engage in the annular slot 15 as shown by the broken line.

Accordingly, when the operating ring 12 is rotated in a direction reverse to that of the rotation in the aforesaid zooming operation, then the rotation thereof will be transmitted via linear slots 13 and 14 to the guide pins 5 and 7, such that the moveable lens frames 2 and 4 will be shifted, with its rotation, by means of the helical cam slots 8 and 10 toward a short focal length side along the optical axis relative to the fixed cylinder 1, while the rotation of the operating ring 12 will not be transmitted because of the guide pin 6 slideably engaging the annular slot 15, thereby maintained stationary relative to the fixed cylinder 1. This provides the macro-photography lens system suited for photographing an object located at an extremely close distance from the camera.

Thus, reversing the aforesaid operations will change the arrangement for the aforesaid macro-photographing to that for the zooming relationship.

The above description of the mechanical lens control has been directed to the lens control system of the second embodiment as shown in FIG. 2. However, in application to the first embodiment of the invention as shown in FIG. 1, the click slot 16 of the operating ring 12 may be retracted so as to engage with the click ball 18, under the condition when zoomed to a long focal length, in an attempt to cause the pin of the moveable lens frame of the compensating lens III to engage the annular slot 15. On the other hand, to practice the third embodiment of the invention in the condition when zoomed to a long focal length side, the operating ring 12 may be retracted so as to cause the click slot 16 to engage with the click ball 18, such that the pin of the moveable lens frame of the second lens group III$b$ in the compensating lens component will slideably engage the annular slot, thus effecting the macrophotographing lens system.

While the description has been given to the specific embodiments of the invention, it should be understood that various modifications and alternations may be anticipated to those skilled in the art. However, these should be construed to be within the scope and purview of the claims that follow.

1. In a zoom lens system capable of macrophotography, a zooming lens component, a compensating lens component, one of said components including a first lens group having at least one lens element and a second lens group having at least one lens element, control means for concurrently moving said lens components as units along the lens system optical axis and relative to each other for the purpose of zooming operation, and release means for releasing one of said lens groups from the control of said control means and maintaining it stationary along said optical axis so that the control means performs the control of said movement of the other lens group and the other lens component which does not include said two lens groups with leaving said released lens group at the released position for the purpose of focusing on the macrophotography.

2. A zoom lens system as set forth in claim 1, wherein said system further comprises:
a focusing lens component moveable along the optical axis for focusing and positioned on a photographic object side on said optical axis with respect to said zooming lens component and said compensating lens component; and
an image forming lens component whose position is fixed on said optical axis and positioned on the photographic image side on said optical axis with respect to said zooming lens component and said compensating lens component.

3. A zoom lens system as set forth in claim 2, wherein said zooming lens component has a negative refractive power and said compensating lens component has an overall negative refractive power, said compensating lens component consisting of a first lens group which includes at least one lens element and has a negative refractive power, and a second lens group which includes at least one lens element, has a positive refractive power and is located on the photographic image side of said first lens group; and wherein said release means includes means for releasing said second lens group from the control of said lens control means when said lens system is adjusted in the zooming mode to a long focal length relationship by means of said lens control means.

4. In a zoom lens system capable of macrophotography;
a zooming lens component;
a compensating lens component, at least one of said lens components including a first lens group having at least one lens element and a second lens group having at least one lens element;
a focussing lens component moveable along the optical axis for focussing and positioned on a photographic object side on said optical axis with respect to said zooming lens component and said compensating lens component;
an image forming lens component whose position is fixed on said optical axis and positioned on the photographic image side on said optical axis with respect to said zooming lens component and said compensating lens component;
one of said zooming lens and compensating lens components including a first lens group having at least one lens element and a second lens group having at least one lens element;
control means for concurrently moving said zooming lens component and said compensating lens component as units along the lens system optical axis and relative to each other for the purpose of zooming operation; and
release means for releasing one of said lens groups from the control of said control means and maintaining it stationary along said optical axis so that the control means performs the control of said movement of the other lens group and the other of said zooming and compensating lens components which does not include said two lens groups with leaving said released lens group at the released position for the purpose of focussing on the macrophotography, said control and release means comprising;
a fixed cylinder holding said image forming component;
first, second and third moveable frames separated from each other, said first and second frames each respectively holding said first and second lens groups included in one of said zooming and compensating lens components and said third frame holding the other of said zooming and compensating lens components, each of said frames being rotatable relative to said fixed cylinder and slideably moveable along the optical axis according to the rotation thereof with said first and second frames moving as a unit relative to said third frame; and
a member rotatable relative to said fixed cylinder, said member being slideably moveable along the optical axis between a first position which is on the optical axis and which permits the transmission of the rotation thereof to each of said moveable lens frames, and a second position which is on the optical axis and which interrupts the transmission of the rotation thereof to one of said first and second frames whereby to release said one frame from the control of said rotatable member and to maintain the frame stationary along said optical axis.

5. The lens system of claim 4, wherein said fixed cylinder is provided with first, second and third cams, said first and second cams having similar shapes different from that of said third cam; each of said first, second and third frames is provided with a cam follower engaging with said first, second and third cams respectively; said rotatable member is provided with a linear guide elongated along the optical axis and engageable with said cam followers for transmitting the rotation of the rotatable member to said three frames whereby said frames are shifted by means of the engagement between the cams and cam followers, respectively; and said rotatable member is further provided with an escape guide branched from said linear guide at right angles, said escape guide being coincidable one of said cam followers of the first and second frames only when said rotatable member is at said second position whereby said one cam follower escapes into said escape guide without transmission of the rotation of said rotatable member.

* * * * *